(No Model.)
G. BRISTOL.
GATE.
No. 320,534.                    Patented June 23, 1885.
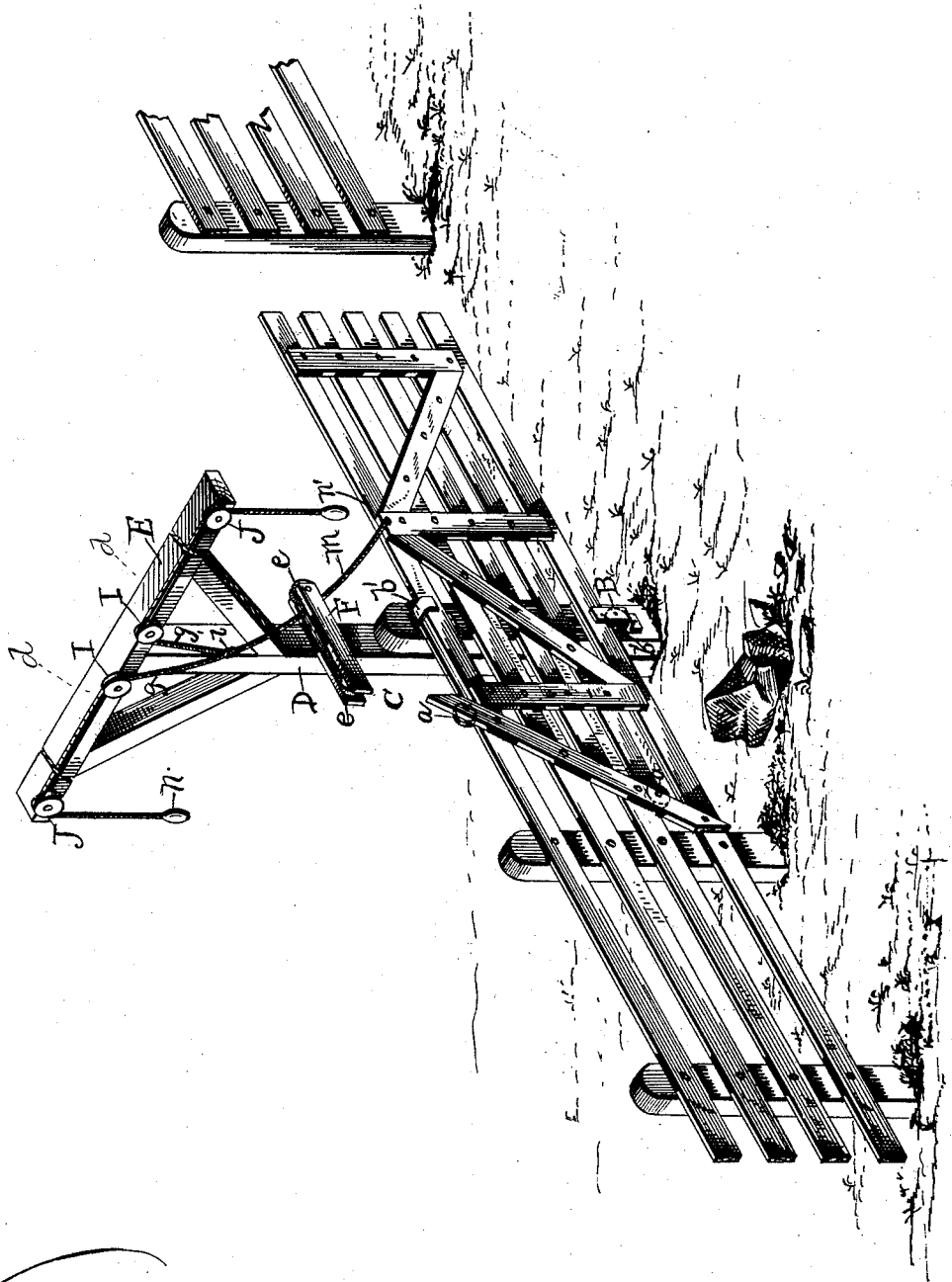
WITNESSES
INVENTOR
George Bristol
by. Frank Sheehy
his Attorney

UNITED STATES PATENT OFFICE.

GEORGE BRISTOL, OF REEDSBURG, WISCONSIN.

GATE.

SPECIFICATION forming part of Letters Patent No. 320,534, dated June 23, 1885.

Application filed March 15, 1884. (No model.)

*To all whom it may concern:*

Be it known that I, GEORGE BRISTOL, a citizen of the United States, residing at Reedsburg, in the county of Sauk and State of Wisconsin, have invented certain new and useful Improvements in Gates, of which the following is a specification, reference being had therein to the accompanying drawing.

The figure is a perspective view of my gate in connection with a fence.

This invention has relation to improvements in that class of gates known as "sliding" and "rolling" gates. It is designed as an improvement upon the patent granted to W. D. Clark, January 7, 1868; and has for its object to provide a cheap and simple means whereby the gate may be opened and closed by a person mounted upon a horse, seated in a vehicle, or standing upon the roadway by but very little exertion.

The invention consists, in connection with a rolling gate, of the peculiar construction and novel arrangement of devices as will be hereinafter more fully set forth, and particularly pointed out in the claim appended.

My gate is constructed of boards fastened together by cleats in the usual manner, the inner end of the gate extending beyond the supporting-post $c$, and beveled, as shown. At both the upper and lower corners of the inner end of the gate are anti-friction rollers $a\ a$, for the purpose of holding the gate in its place on the fence. A roller, B, and guide $b'$ on the supporting-post, help to sustain the weight of the gate acting conjointly with the rollers $a'\ a'$, and so far the construction is that shown in the patent referred to. To the supporting-post C I secure a vertical post, D, and to the upper end of this post D I secure a beam, E. This beam is secured to the said post at its middle under side, having its arms $d\ d$ extending, respectively, upon opposite sides of the fence over the gate.

F indicates a block, secured to the post D a sufficient distance above the top rail of the gate and on a plane transverse thereto. This block F is provided with two vertical pulleys, $e\ e$, which have their bearings upon opposite sides of the post D. The beam E is suitably braced upon the post D, and is provided with two sets of pulleys, I and J, which are arranged as shown, having one on each side of its junction with the said vertical post, and one upon each outer end thereof. Over these pulleys pass cords or ropes $g\ g$, which are provided at their outer ends with suitable handles, $n\ n$, for the grasp of the operator, and meet and connect at their inner ends above the double pulley-block F, as shown at $i$, to the cord $m$, which extends down between the pulleys to the top rail of the gate, and is secured to the said rail, as shown at $n'$.

By this construction it will be perceived that the gate may be opened and closed by pulling upon the same handle; or the gate may be opened by pulling upon one handle, and closed by pulling upon the other.

When the gate is in a closed position, and the operator pulls upon one of the handles secured to the ropes, drawing it down, the gate will be driven open, carrying with it the said ropes, and the handles will again rise to their normal position, so that the gate may be closed by giving either of the handles another pull.

I am aware of the Patent No. 152,613, in which the gate is supported upon grooved rollers arranged in posts, and the upper rail of the gate inclined on its under side in opposite directions to engage the rollers, the said top rail having a pivoted latch-bar, and operated by a rope which is connected to the middle portion of the said top rail of the gate, the rope passing through pulleys in the uprights and carried to a post arranged at one side of the gate, and therefore do not claim such devices broadly.

Having thus described my invention, what I claim as new, and desire to secure by Letters Patent, is—

The combination, with the fence and gate, constructed as described, of the vertical post D, provided at its upper end with the transverse bar E, and above the gate with the pulley-block F, carrying pulleys $e$, arranged as shown, the ropes $g\ g$, passing over pulleys on the upper transverse bar, E, the said ropes being connected at their inner ends above the block F with a single rope, m, passing downwardly between the said pulleys e, guided by the pulley-block, and connected to the top rail of the gate about midway of its length, whereby the gate may be opened and closed by either rope g from opposite sides of the fence, substantially as specified.

In testimony whereof I affix my signature in presence of two witnesses.

GEORGE BRISTOL.

Witnesses:
   WILKINS WARWICK,
   ALBERT ETHRIDGE.